(12) United States Patent
Koskinen et al.

(10) Patent No.: US 10,779,245 B2
(45) Date of Patent: Sep. 15, 2020

(54) POWER CLASS BASED COVERAGE ENHANCEMENT LEVEL SELECTION

(71) Applicant: NOKIA TECHNOLOGIES OY, Espoo (FI)

(72) Inventors: Jussi-Pekka Koskinen, Oulu (FI); Jorma Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/323,057

(22) PCT Filed: Aug. 3, 2017

(86) PCT No.: PCT/FI2017/050563
§ 371 (c)(1),
(2) Date: Feb. 4, 2019

(87) PCT Pub. No.: WO2018/024947
PCT Pub. Date: Feb. 8, 2018

(65) Prior Publication Data
US 2019/0174434 A1    Jun. 6, 2019

Related U.S. Application Data

(60) Provisional application No. 62/371,344, filed on Aug. 5, 2016.

(51) Int. Cl.
*H04W 52/36* (2009.01)
*H04W 8/22* (2009.01)
(Continued)

(52) U.S. Cl.
CPC ........ *H04W 52/367* (2013.01); *H04B 17/318* (2015.01); *H04W 4/80* (2018.02);
(Continued)

(58) Field of Classification Search
CPC ....... H04W 52/36; H04W 4/80; H04W 52/24; H04W 74/08; H04W 8/22; H04W 80/02;
(Continued)

(56) References Cited

U.S. PATENT DOCUMENTS

2012/0099444 A1* 4/2012 Hakola ............... H04W 52/242
370/248
2014/0286219 A1* 9/2014 Siomina ............... H04J 11/0023
370/311
(Continued)

FOREIGN PATENT DOCUMENTS

EP          2334124 A1   6/2011
EP          2523518 A1   11/2012
WO     WO 2015/116732 A1   8/2015

OTHER PUBLICATIONS

International Search Report & Written Opinion dated Nov. 9, 2017 corresponding to International Patent Application No. PCT/FI2017/050563.
(Continued)

*Primary Examiner* — Kyaw Z Soe
(74) *Attorney, Agent, or Firm* — Squire Patton Boggs (US) LLP (57) ABSTRACT

In accordance with the exemplary embodiments of the invention there is at least a method and apparatus to perform receiving, by a user equipment, signaling including at least one of a plurality of reference signal received power (RSRP) threshold levels; determining, by the user equipment, a power class parameter associated with the user equipment; and selecting, based on at least the at least one of the plurality of reference signal received power threshold levels and said power class parameter, a resource set of one or more resource sets to perform a network access procedure with a communication network.

19 Claims, 5 Drawing Sheets

(51) Int. Cl.

| | |
|---|---|
| *H04W 74/08* | (2009.01) |
| *H04W 52/24* | (2009.01) |
| *H04B 17/318* | (2015.01) |
| *H04W 52/14* | (2009.01) |
| *H04W 52/26* | (2009.01) |
| *H04W 4/80* | (2018.01) |
| *H04W 80/02* | (2009.01) |
| *H04L 1/08* | (2006.01) |

(52) U.S. Cl.
CPC ........... *H04W 8/22* (2013.01); *H04W 52/146* (2013.01); *H04W 52/242* (2013.01); *H04W 52/265* (2013.01); *H04W 74/0833* (2013.01); *H04W 80/02* (2013.01); *H04L 1/08* (2013.01)

(58) Field of Classification Search
CPC ........... H04W 74/0833; H04W 52/242; H04W 52/146; H04W 52/367; H04W 52/265; H04B 17/318
See application file for complete search history.

(56) References Cited

U.S. PATENT DOCUMENTS

| | | | |
|---|---|---|---|
| 2015/0016312 A1* | 1/2015 | Li | ............................ H04L 5/14 370/280 |
| 2015/0327180 A1* | 11/2015 | Ryu | .......................... H04L 1/00 370/329 |
| 2016/0150570 A1 | 5/2016 | Wang et al. | |
| 2019/0387484 A1* | 12/2019 | Ioffe | ....................... H04W 4/70 |

OTHER PUBLICATIONS

Huawei et al., "Measurement, reporting, and configuration of coverage enhancement," 3GPP, R1-144573, 3GPP TSG RAN WG1 Meeting #79, San Francisco, USA, Nov. 2014.

Extended European Search Report corresponding to EP Appln. No. 17836467.5, dated Mar. 3, 2020.

LG Electronics, et al., "WF on initial CE level selection of low power UEs", 3GPP TSG RAN WG1 Meeting #87, Reno, USA, Nov. 14-18, 2016, R1-1613361, 3 pages.

Catt, "Coverage enhancement for PRACH", 3GPP TSG RAN WG1 Meeting #80, Athens, Greece, Feb. 9-13, 2015, R1-150098, 3 pages.

Notification of Ground of rejection dated Feb. 5, 2020 corresponding to Japanese Patent Application No. 2019-505374, and English translation thereof.

NTT Docomo, Inc. "Functional extension for U-plane C-IoT optimisation," R2-164576, 3GPP TSG-RAN WG2 Meeting #94, Nanjing, China, May 23-27, 2016, Jun. 8, 2016.

3GPP, "RAN4#78 Meeting Report," R4-161502, 3GPP TSG-RAN WG4 Meeting #78bis, San Jose del Cabo, Mexico, Apr. 11-15, 2016, Apr. 15, 2016.

Communication pursuant to Article 94(3) EPC dated Jun. 10, 2020 corresponding to European Patent Application No. 17836467.5.

\* cited by examiner

PRACH-Config information elements
```
-- ASN1START
PRACH-ConfigSIB ::=            SEQUENCE {
    rootSequenceIndex          INTEGER (0..837),
    prach-ConfigInfo           PRACH-ConfigInfo
}
PRACH-ConfigSIB-v1310 ::=      SEQUENCE {
    rsrp-ThresholdsPrachInfoList-r13    RSRP-ThresholdsPrachInfoList-r13,
    mpdcch-startSF-CSS-RA-r13           CHOICE {
        fdd-r13                             ENUMERATED {v1, v1dot5, v2, v2dot5, v4, v5, v8,
                                                        v10},
        tdd-r13                             ENUMERATED {v1, v2, v4, v5, v8, v10, v20, spare}
    }                                                               OPTIONAL,     -- Cond MP
    prach-HoppingOffset-r13             INTEGER (0..94)             OPTIONAL,     -- Need OR
    prach-ParametersListCE-r13          PRACH-ParametersListCE-r13
}
PRACH-Config ::=               SEQUENCE {
    rootSequenceIndex          INTEGER (0..837),
    prach-ConfigInfo           PRACH-ConfigInfo                     OPTIONAL      -- Need ON
}
PRACH-Config-v1310 ::=         SEQUENCE {
    rsrp-ThresholdsPrachInfoList-r13    RSRP-ThresholdsPrachInfoList-r13    OPTIONAL,    -- Cond HO
    mpdcch-startSF-CSS-RA-r13           CHOICE {
        fdd-r13                             ENUMERATED {v1, v1dot5, v2, v2dot5, v4, v5, v8,
                                                        v10},
        tdd-r13                             ENUMERATED {v1, v2, v4, v5, v8, v10, v20, spare}
    }                                                               OPTIONAL,     -- Cond MP
    prach-HoppingOffset-r13             INTEGER (0..94)             OPTIONAL,     -- Need OR
    prach-ParametersListCE-r13          PRACH-ParametersListCE-r13  OPTIONAL,     -- Cond MP
    initial-CE-level-r13                INTEGER (0..3)              OPTIONAL      -- Need OR
}
PRACH-ConfigSCell-r10 ::=      SEQUENCE {
    prach-ConfigIndex-r10      INTEGER (0..63)
}
PRACH-ConfigInfo ::=           SEQUENCE {
    prach-ConfigIndex          INTEGER (0..63),
    highSpeedFlag              BOOLEAN,
    zeroCorrelationZoneConfig  INTEGER (0..15),
    prach-FreqOffset           INTEGER (0..94)
}
PRACH-ParametersListCE-r13 ::= SEQUENCE (SIZE(1..maxCE-Level-r13)) OF PRACH-ParametersCE-r13
PRACH-ParametersCE-r13 ::=     SEQUENCE {
    prach-ConfigIndex-r13      INTEGER (0..63),
    prach-FreqOffset-r13       INTEGER (0..94),
    prach-StartingSubframe-r13 ENUMERATED {sf2, sf4, sf8, sf16, sf32, sf64, sf128,
                                           sf256}                   OPTIONAL,     -- Need OP
    maxNumPreambleAttemptCE-r13
                               ENUMERATED {n3, n4, n5, n6, n7, n8, n10}   OPTIONAL,   -- Need OP
    numRepetitionPerPreambleAttempt-r13    ENUMERATED {n1,n2,n4,n8,n16,n32,n64,n128},
    mpdcch-NarrowbandsToMonitor-r13        SEQUENCE (SIZE(1..2)) OF
                                               INTEGER (1..maxAvailNarrowBands-r13),
    mpdcch-NumRepetition-RA-r13            ENUMERATED {r1, r2, r4, r8, r16,
                                                       r32, r64, r128, r256},
    prach-HoppingConfig-r13                ENUMERATED {on,off}
}
RSRP-ThresholdsPrachInfoList-r13 ::= SEQUENCE (SIZE(1..3)) OF RSRP-Range
-- ASN1STOP
```

FIGURE 1

| PRACH-Config field descriptions |
|---|
| *initial-CE-level*<br>Indicates initial PRACH CE level at random access, see TS 36.321 [6]. If not configured, UE selects PRACH CE level based on measured RSRP level, see TS 36.321 [6]. |
| *highSpeedFlag*<br>Parameter: High-speed-flag, see TS 36.211 [21, 5.7.2]. TRUE corresponds to Restricted set and FALSE to Unrestricted set. |
| *maxNumPreambleAttemptCE*<br>Maximum number of preamble transmission attempts per CE level. See TS 36.321 [6]. |
| *mpdcch-NarrowbandsToMonitor*<br>Narrowbands to monitor for MPDCCH for RAR, see TS 36.213 [23]. |
| *mpdcch-NumRepetition-RA*<br>Maximum number of repetitions for MPDCCH common search space (CSS) for RAR, Msg3 and Msg4, see TS 36.211 [21]. |
| *mpdcch-startSF-CSS-RA*<br>Starting subframe configuration for MPDCCH common search space (CSS), including RAR, Msg3 retransmission, PDSCH with contention resolution and PDSCH with *RRCConnectionSetup*, see TS 36.211 [21] and TS 36.213 [23]. Value v1 corresponds to 1, value v1dot5 corresponds to 1.5, and so on. |
| *numRepetitionPerPreambleAttempt*<br>Number of PRACH repetitions per attempt for each CE level, See TS 36.211 [21]. |
| *prach-ConfigIndex*<br>Parameter: *prach-ConfigurationIndex*, see TS 36.211 [21, 5.7.1]. |
| *prach-FreqOffset*<br>Parameter: *prach-FrequencyOffset*, see TS 36.211 [21, 5.7.1]. For TDD the value range is dependent on the value of *prach-ConfigIndex*. |
| *prach-HoppingConfig*<br>Coverage level specific frequency hopping configuration for PRACH. |
| *prach-ParametersListCE*<br>Configures PRACH parameters for each CE level. The first entry in the list is the PRACH parameters of CE level 0, the second entry in the list is the PRACH parameters of CE level 1, and so on. |
| *prach-StartingSubframe*<br>PRACH starting subframe periodicity, expressed in number of subframes available for preamble transmission (PRACH opportunities), see TS 36.211 [21]. Value sf2 corresponds to 2 subframes, sf4 corresponds to 4 subframes and so on. EUTRAN configures the PRACH starting subframe periodicity larger than or equal to the Number of PRACH repetitions per attempt for each CE level (*numRepetitionPerPreambleAttempt*). |
| *rootSequenceIndex*<br>Parameter: *RACH_ROOT_SEQUENCE*, see TS 36.211 [21, 5.7.1]. |
| *rsrp-ThresholdsPrachInfoList*<br>The criterion for BL UEs and UEs in CE to select PRACH resource set. Up to 3 RSRP threshold values are signalled to determine the CE level for PRACH, see TS 36.213 [23]. The first element corresponds to RSRP threshold 1, the second element corresponds to RSRP threshold 2 and so on, see TS 36.321 [6]. |
| *zeroCorrelationZoneConfig*<br>Parameter: $N_{CS}$ configuration, see TS 36.211 [21, 5.7.2: table 5.7.2-2] for preamble format 0..3 and TS 36.211 [21, 5.7.2: table 5.7.2-3] for preamble format 4. |

POWER CLASS BASED COVERAGE ENHANCEMENT LEVEL SELECTION

TECHNICAL FIELD

The teachings in accordance with the example embodiments of this invention relate generally to optimizing a random access for lower power NB-IOT UE and, more specifically, relate to taking a power class of the UE into account in a PRACH resource selection for a CE level determination.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

At 3GPP LTE RAN #69 plenary meeting, a new work item named NB-IOT was approved. Since then the 3GPP organization has been working on solutions for the operation of machine-type communications (MTC) and for NB-IOT (Narrow Band Internet of Things).

The NB-IOT is expected to support up to a 20 dB coverage improvement, a massive number of low throughput devices, low delay sensitivity, ultra-low device cost, low device power consumption, and (e.g., optimized) network structure. Furthermore, NB-IOT bandwidth is only 180 kHz, corresponding to one PRB (and 12 subcarriers) in LTE.

Advantages of NB-IOT can include smart metering for remotely collecting electricity, water and gas meter data over the cellular network. This aspect of the NB-IOT topic is mainly due to the market opportunity it presents. Such smart metering can consequently help cut down cost generated from manual meter reading and changing of meter batteries for example.

The example embodiments of the invention work to optimize random access procedures for NB-IOT such that at least random access failure rates of devices using NB-IOT is reduced or eliminated.

Certain abbreviations that may be found in the description and/or in the Figures are herewith defined as follows:
CE Coverage Enhancement
CP Control Plane
dB Decibels
dBm Decibels milliwatt
eNB Enhanced NodeB
HO Handover
MT Mobile Terminated
MTC Machine-Type Communications
NB-IOT Narrow Band Internet of Things
PRACH packet random access channel
RLF Radio Link Failure
RRC Radio resource control
RSRP Reference Signal Received Power
TX Transmission
UE User Equipment
UP User Plane

SUMMARY

This section contains examples of possible implementations and is not meant to be limiting.

In one exemplary embodiment, a method comprises receiving, by a user equipment, signaling comprising at least one of a plurality of reference signal received power (RSRP) threshold levels; determining, by the user equipment, a power class parameter associated with the user equipment; and selecting, based on at least the at least one of the plurality of reference signal received power threshold levels and said power class parameter, a resource set of one or more resource sets to perform a network access procedure with a communication network A further exemplary embodiment of the invention is a method comprising the method of the previous paragraph, wherein the power class parameter defines a maximum output power available at the user equipment for any transmission bandwidth. An additional exemplary embodiment is the method of this paragraph and/or the previous paragraph, wherein said power class parameter associated with the user equipment is received from the communication network in a system information block. Another exemplary embodiment is the method of this paragraph and/or the previous paragraph, wherein the at least one of the plurality of reference signal received power threshold levels is used to determine a coverage enhancement level for selecting the resource set. In another exemplary embodiment is the method of this paragraph and/or the previous paragraph, comprising adjusting the at least one of the plurality of reference signal received power threshold levels by said power class parameter, and wherein the selecting comprises using the adjusted reference signal received power threshold levels to determine a coverage enhancement level for selecting the resource set for the network access procedure with the communication network. In a further exemplary embodiment is the method of this paragraph and/or the previous paragraph, the adjusting comprises: for a case that the power class parameter is less than a threshold level the adjusting comprises increasing the threshold level, and for a case that the power class parameter is greater than a threshold level the adjusting comprises decreasing the threshold level. An additional exemplary embodiment is the method of this paragraph and/or the previous paragraph, wherein the plurality of reference signal received power threshold levels correspond to an RSRP threshold 1, an RSRP threshold 2, and an RSRP threshold 3. Still another exemplary embodiment is the method of this paragraph and/or the previous paragraph, wherein for a case that the power class parameter indicates the user equipment is a 14 dBm device, the RSRP threshold 1 is selected to perform the network access procedure with the communication network. Another exemplary embodiment is the method of this paragraph and/or the previous paragraph, wherein the plurality of reference signal received power threshold levels are received from the communication network in a system information block. A further exemplary embodiment is the method of this paragraph and/or the previous paragraph, wherein the communication network comprises a narrow band internet of things (NB-IoT) network. Another additional exemplary embodiment is the method of this paragraph and/or the previous paragraph, wherein the user equipment is a device which supports a power class of 14 dBm. In still another exemplary embodiment is the method of this paragraph and/or the previous paragraph, wherein the network access procedure comprises a physical random access channel procedure.

In another exemplary embodiment, an apparatus comprises means for receiving, by a user equipment, signaling comprising at least one of a plurality of reference signal received power (RSRP) threshold levels; means for determining, by the user equipment, a power class parameter associated with the user equipment; and means, based on at least the at least one of the plurality of reference signal received power threshold levels and said power class parameter, for selecting a resource set of one or more resource sets to perform a network access procedure with a communication network.

A further exemplary embodiment of the invention is an apparatus comprising the apparatus of the previous paragraph, wherein the power class parameter defines a maximum output power available at the user equipment for any transmission bandwidth. Another exemplary embodiment is the method of this paragraph and/or the previous paragraph, wherein said power class parameter associated with the user equipment is received from the communication network in a system information block. A further exemplary embodiment is the apparatus of this paragraph and/or the previous paragraph, wherein the at least one of the plurality of reference signal received power threshold levels is used to determine a coverage enhancement level for selecting the resource set. Another additional exemplary embodiment is the apparatus of this paragraph and/or the previous paragraph, comprising: means for adjusting the at least one of the plurality of reference signal received power threshold levels by said power class parameter, and wherein the selecting comprises means, using the adjusted reference signal received power threshold levels, for determining a coverage enhancement level for selecting the resource set for the network access procedure with the communication network. Still another exemplary embodiment is the apparatus of this paragraph and/or the previous paragraph, wherein the means for adjusting comprises: for a case that the power class parameter is less than a threshold level the adjusting comprises increasing the threshold level, and for a case that the power class parameter is greater than a threshold level the adjusting comprises decreasing the threshold level. Another exemplary embodiment is the apparatus of this paragraph and/or the previous paragraph, wherein the plurality of reference signal received power threshold levels correspond to an RSRP threshold 1, an RSRP threshold 2, and an RSRP threshold 3. Another additional exemplary embodiment is the apparatus of this paragraph and/or the previous paragraph, wherein for a case that the power class parameter indicates the user equipment is a 14 dBm device, the RSRP threshold 1 is selected to perform the network access procedure with the communication network. An additional exemplary embodiment is the apparatus of this paragraph and/or the previous paragraph, wherein the plurality of reference signal received power threshold levels are received from the communication network in a system information block. Still another additional exemplary embodiment is the apparatus of this paragraph and/or the previous paragraph, wherein the communication network comprises a narrow band internet of things (NB-IoT) network. An additional exemplary embodiment is the apparatus of this paragraph and/or the previous paragraph, wherein the user equipment is a device which supports a power class of 14 dBm. Yet another exemplary embodiment is the apparatus of this paragraph and/or the previous paragraph, wherein the network access procedure comprises a physical random access channel procedure.

Another exemplary embodiment of the invention is an apparatus comprising at least one processor; and at least one memory including computer program code, where the at least one memory and the computer program code are configured, with the at least one processor, to cause the apparatus to at least: receive, by a user equipment, signaling comprising at least one of a plurality of reference signal received power (RSRP) threshold levels; determine, by the user equipment, a power class parameter associated with the user equipment; and select, based on at least the at least one of the plurality of reference signal received power threshold levels and said power class parameter, a resource set of one or more resource sets to perform a network access procedure with a communication network.

An additional exemplary embodiment is the apparatus of this paragraph and/or the previous paragraph, wherein the power class parameter defines a maximum output power available at the user equipment for any transmission bandwidth. Another exemplary embodiment is the apparatus of this paragraph and/or the previous paragraph, wherein said power class parameter associated with the user equipment is received from the communication network in a system information block. Still another exemplary embodiment is the apparatus of this paragraph and/or the previous paragraph, wherein the at least one of the plurality of reference signal received power threshold levels is used to determine a coverage enhancement level for selecting the resource set. An additional exemplary embodiment is the apparatus of this paragraph and/or the previous paragraph, wherein the at least one memory including the computer program code is configured with the at least one processor to cause the apparatus to: adjust the at least one of the plurality of reference signal received power threshold levels by said power class parameter, and wherein the selecting comprises using the adjusted reference signal received power threshold levels to determine a coverage enhancement level for selecting the resource set for the network access procedure with the communication network. An added exemplary embodiment is the apparatus of this paragraph and/or the previous paragraph, wherein the adjusting comprises: for a case that the power class parameter is less than a threshold level the adjusting comprises increasing the threshold level, and for a case that the power class parameter is greater than a threshold level the adjusting comprises decreasing the threshold level. An additional exemplary embodiment is the apparatus of this paragraph and/or the previous paragraph, wherein the plurality of reference signal received power threshold levels correspond to an RSRP threshold 1, an RSRP threshold 2, and an RSRP threshold 3. Another exemplary embodiment is the apparatus of this paragraph and/or the previous paragraph, wherein for a case that the power class parameter indicates the user equipment is a 14 dBm device, the RSRP threshold 1 is selected to perform the network access procedure with the communication network. An additional exemplary embodiment is the apparatus of this paragraph and/or the previous paragraph, wherein the plurality of reference signal received power threshold levels are received from the communication network in a system information block. Another additional exemplary embodiment is the apparatus of this paragraph and/or the previous paragraph, wherein the communication network comprises a narrow band internet of things (NB-IoT) network. Still another exemplary embodiment is the apparatus of this paragraph and/or the previous paragraph, wherein the user equipment is a device which supports a power class of 14 dBm. Yet another additional exemplary embodiment is the apparatus of this paragraph and/or the previous paragraph, wherein the network access procedure comprises a physical random access channel procedure.

Another exemplary embodiment is a computer program comprising program code for executing a method according to any of claims.

An additional exemplary embodiment is the computer program code of the previous paragraph, wherein the computer program is a computer program product comprising a non-transitory computer-readable medium bearing computer program code embodied therein for use with a computer.

Another exemplary embodiment of the invention is an apparatus comprising at least one processor; and at least one memory including computer program code, where the at least one memory and the computer program code are configured, with the at least one processor, to cause the apparatus to at least: transmit, by a network node, signaling comprising at least one of a plurality of reference signal received power (RSRP) threshold levels; receive, at the network node, uplink transmissions from a user equipment via a network access procedure on a resource set of one or more resource sets selected by the user equipment based on at least the at least one of the plurality of reference signal received power threshold levels and a power class parameter associated with the user equipment.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 2 shows PRACH-Config field descriptions as in 3GPP TS 36.321 V13.1.0 (2016-03);

DETAILED DESCRIPTION

In this invention, it is proposed a method to optimize a random access for NB-IOT UE including taking a power class of a user equipment (UE) into account in a PRACH resource selection for a CE level determination.

The 3GPP organization has been working on solutions for the operation of machine-type communications (MTC) and for NB-IOT (Narrow Band Internet of Things, type work items RP-151621). There are two modes for data transmission, control plane (CP) and user plane (UP) solutions. With the UP solution the UE is in connected mode however at this time handovers are not supported. During longer breaks in the data transmission, the connection may also be suspended to be later resumed without complete connection setup procedure.

This NB-IOT technology is a narrowband radio technology specially designed for the Internet of Things (IOT), as described in its name. This standard can be seen to focus on indoor coverage, low cost, long battery life and large number of devices. This NB-IOT technology can be deployed in GSM and LTE spectrum. Further, the technology can be deployed "in-band", utilizing resource blocks within a normal LTE carrier, or in the unused resource blocks within a LTE carrier's guard-band, or "standalone" for deployments in dedicated spectrum. NB-IOT is also suitable for the re-farming of GSM channels.

It has been discussed that NB-IOT will support the following three operation modes:

Stand-alone operation, utilizing for example the spectrum currently being used by GERAN systems as a replacement of one or more GSM carriers.

Guard-band operation, utilizing the unused resource blocks within an LTE carrier's guard-band.

In-band operation, utilizing resource blocks within a normal LTE carrier.

The NB-IOT is expected to support coverage improvement, a massive number of low throughput devices, low delay sensitivity, ultra-low device cost, low device power consumption, and (e.g., optimized) network structure.

The example embodiments of the invention work to optimize a random access procedure for NB-IOT UE by taking a power class of the UE into account in a PRACH resource selection for a CE level determination of a device operating with NB-IOT.

It is noted that a random access channel (RACH) procedure may be triggered at a UE operating with NB-IOT. Such a procedure can be triggered when the UE is camped on to a cell or is turned on, and/or the UE is moving from idle to connected state. Further, for a case where an eNB receives downlink (DL) data but it is determined that uplink (UL) synchronization with the UE is not available, the eNB may notify the UE to do a PRACH procedure.

In accordance with section 5.1.1 of 3GPP TS 36.321 V13.1.0 (2016-03):
The Random Access procedure shall be performed with steps as follows:
 Flush the Msg3 buffer;
 set the PREAMBLE_TRANSMISSION_COUNTER to 1;
 if the UE is a BL UE or a UE in enhanced coverage:
  set the PREAMBLE_TRANSMISSION_COUNTER CE to 1;
  if the RSRP threshold of CE level 3 is configured by upper layers in rsrp-ThresholdsPrachInfoList and the measured RSRP is less than the RSRP threshold of CE level 3 then:
   the MAC entity considers to be in CE level 3;
  else if the RSRP threshold of CE level 2 configured by upper layers in rsrp-ThresholdsPrachInfoList and the measured RSRP is less than the RSRP threshold of CE level 2 then:
   the MAC entity considers to be in CE level 2;
  else if the measured RSRP is less than the RSRP threshold of CE level 1 as configured by upper layers in rsrp-ThresholdsPrachInfoList then:
   the MAC entity considers to be in CE level 1;
  else:
   the MAC entity considers to be in CE level 0;
Here, in this random access procedure it can be seen that PREAMBLE_TRANSMISSION_COUNTER_CE is set to 1, and then if the RSRP threshold is of coverage enhancement (CE) level 3, 2, or 1 the MAC entity considers to be in CE level 3, 2, or 1, respectively. Else the MAC entity considers to be in CE level 0.

Further, according to section 5.1.2 of 3GPP TS 36.321 V13.1.0 (2016-03):
The Random Access Resource selection procedure shall be performed as follows:
 If ra-PreambleIndex (Random Access Preamble) and ra-PRACH-MaskIndex (PRACH Mask Index) have been explicitly signalled and ra-PreambleIndex is not 000000:

the Random Access Preamble and the PRACH Mask Index are those explicitly signalled.
else the Random Access Preamble shall be selected by the MAC entity as follows:
If Msg3 has not yet been transmitted, the MAC entity shall, except for BL UEs or UEs in enhanced coverage:
if Random Access Preambles group B exists and if the potential message size (UL data available for transmission plus MAC header and, where required, MAC control elements) is greater than messageSize-GroupA and if the pathloss is less than $P_{CMAX,c}$ (of the Serving Cell performing the Random Access Procedure)—preambleInitialReceivedTarget-Power—deltaPreambleMsg3—messagePowerOffsetGroupB, then:
select the Random Access Preambles group B;
else:
select the Random Access Preambles group A.
else, if Msg3 is being retransmitted, the MAC entity shall:
select the same group of Random Access Preambles as was used for the preamble transmission attempt corresponding to the first transmission of Msg3.
randomly select a Random Access Preamble within the selected group. The random function shall be such that each of the allowed selections can be chosen with equal probability;
set PRACH Mask Index to 0.
determine the next available subframe containing PRACH permitted by the restrictions given by the prach-ConfigIndex, the PRACH Mask Index (see subclause 7.3) and physical layer timing requirements [2] (a MAC entity may take into account the possible occurrence of measurement gaps when determining the next available PRACH subframe);
if the transmission mode is TDD and the PRACH Mask Index is equal to zero:
if ra-PreambleIndex was explicitly signalled and it was not 000000 (i.e., not selected by MAC):
randomly select, with equal probability, one PRACH from the PRACHs available in the determined subframe.
else:
randomly select, with equal probability, one PRACH from the PRACHs available in the determined subframe and the next two consecutive subframes.
else:
determine a PRACH within the determined subframe in accordance with the requirements of the PRACH Mask Index.
proceed to the transmission of the Random Access Preamble (see subclause 5.1.3).

Here, it is indicated that the next available subframe containing PRACH permitted by the restrictions given by the prach-ConfigIndex is determined.

Figure 1:
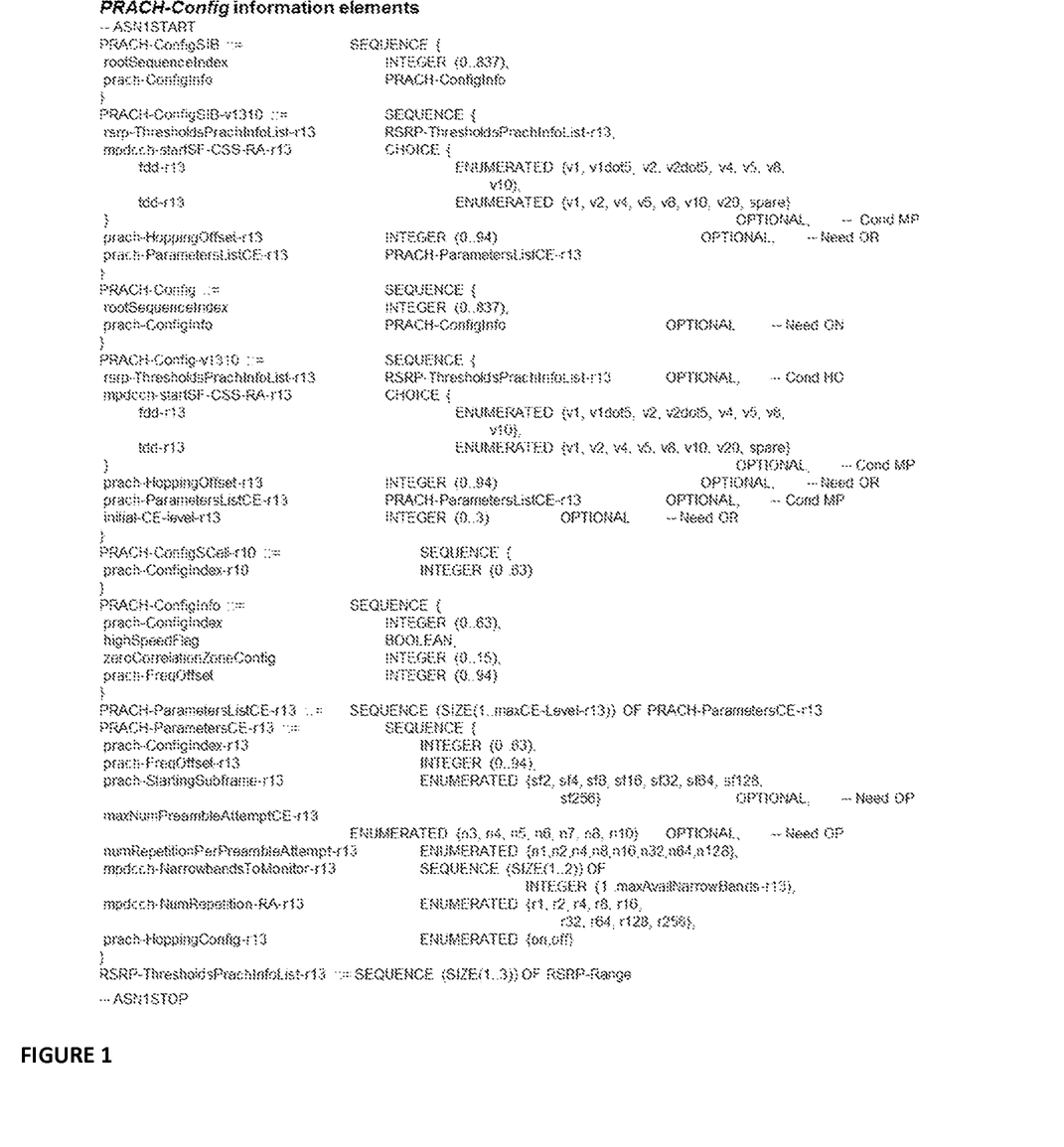
FIG. 1 shows PRACH-Config Information elements as in accordance with 3GPP TS 36.331 V13.2.0 (2016-06)

FIG. 1 shows PRACH-Config Information elements as in accordance with 3GPP TS 36.331 V13.2.0 (2016-06):

As shown in FIG. 1, the PRACH-Config information elements in the PRACH-Config field descriptions include rsrp-ThresholdsPrachInfoList fields.

FIG. 2 illustrates PRACH-Config field descriptions as taken from 3GPP TS 36.321 V13.1.0 (2016-03). As indicated in the PRACH-Config field descriptions of 3GPP as shown in FIG. 2 for a:
rsrp-ThresholdsPrachInfoList
The criterion for BL UEs and UEs in CE to select PRACH resource set. Up to 3 RSRP threshold values are signalled to determine the CE level for PRACH, see TS 36.213 [23]. The first element corresponds to RSRP threshold 1, the second element corresponds to RSRP threshold 2 and so on, see TS 36.321 [6].

As at least shown above, the RSRP threshold values are signaled to determine the CE level for PRACH. It can be seen that only RSRP thresholds are taken into account in the random access resource selection which is used for the CE level determination.

A Reference Signal Received Power (RSRP) can be defined as a linear average over the power contributions of resource elements that carry cell-specific reference signals within the considered measurement frequency bandwidth. For RSRP determination, cell-specific reference signals can be used. A reference point for the RSRP may be an antenna connector of a communication device (e.g., user equipment (UE) and/or a network access device (eNB)). An RSRP measurement, normally expressed in dBm can be used to provide a ranking of different candidate cells based on their signal strength.

However, as at least shown above only an RSRP threshold is seen to be taken into account in the random access resource selection which is used for a coverage enhancement (CE) level determination for example. A power class of the communication device is not taken into account in the CE level selection which may result in the wrong transmission/reception repetitions selections. The above may increase failure rates in initial access, the device battery consumption and may result non-optimized network resource usage and lead to increased intra and inter cell interference.

In addition, it is noted that the following new Power Class objective for REL14 NB-IOT was agreed in RAN plenary:
New Power Class(es)
Evaluate and, if appropriate, specify new UE power class(es) (e.g. 14 dBm), and any necessary signaling support, to support lower maximum transmit power suitable for small form-factor batteries, with appropriate MCL relaxations compared to Rel-13 (RAN4, RAN2).

It is noted that this will introduce additional power classes on top of the two power classes introduced in Rel-13 (23 dBm and 20 dBm).

In accordance with 3GPP, UE Power Classes define the maximum output power for any transmission bandwidth. Whereas, in accordance with the example embodiments of the invention the power class of the UE is taken into account for a CE level determination.

However, as similarly stated above, the power class of the UE is not taken into account in the CE level selection which may result in the wrong transmission/reception repetitions selections. Rather only RSRP thresholds may be taken into account in the random access resource selection which is used for the CE level determination.

The example embodiments of the invention relate to where a Power class of a communication device (e.g., a user equipment (UE)) is taken into account in PRACH resource selection for CE level determination.

Figure 3:
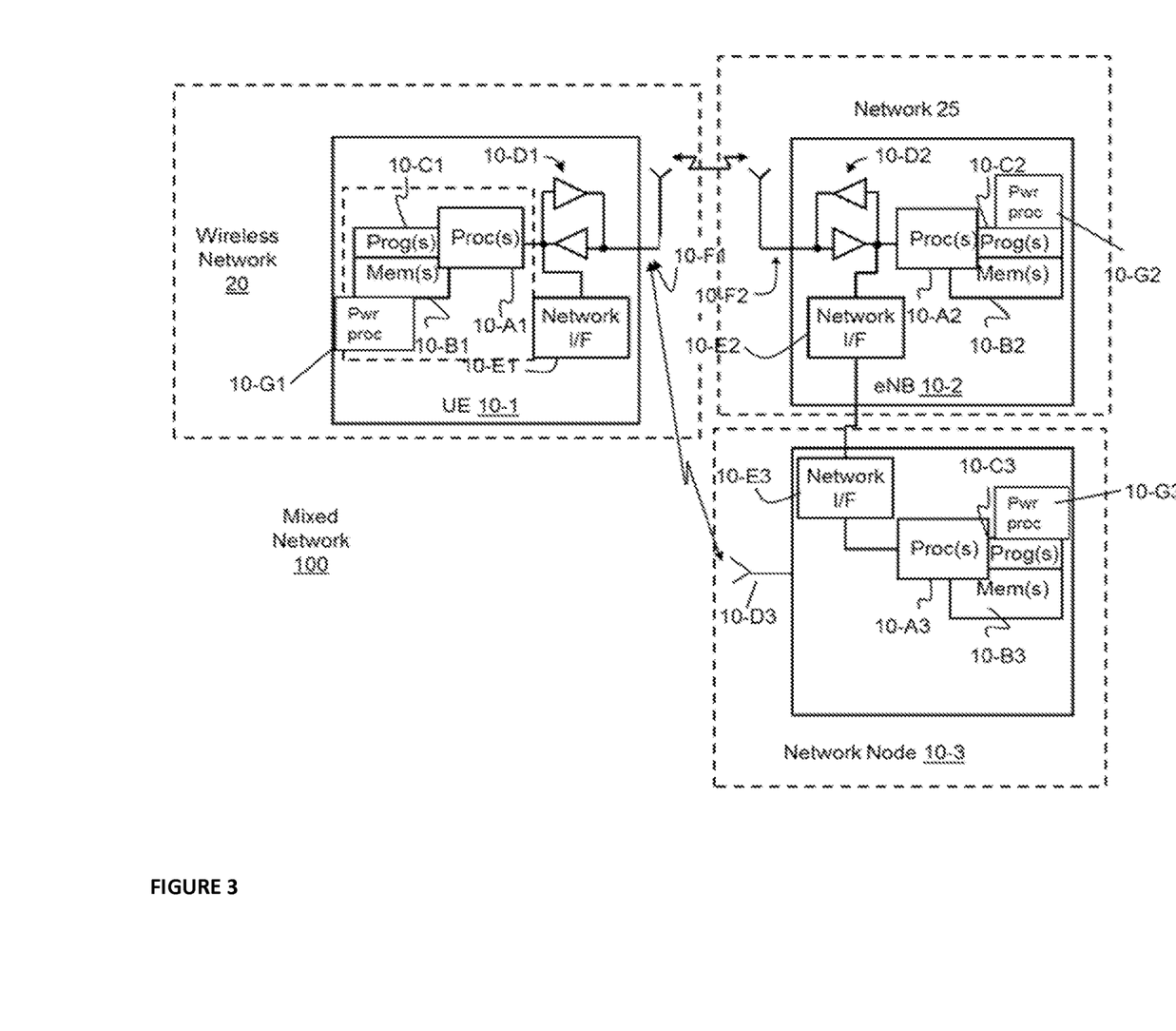
FIG. 3 shows a simplified block diagram of various electronic devices that are suitable for use in practicing the example embodiments of this invention.

Before describing the example embodiments of the invention in further details, reference is made to FIG. 3.

Turning to FIG. 3, FIG. 3 illustrates an overview of one environment where the example embodiments of the invention for optimizing an NB-IOT may be practiced. FIG. 3 is a block diagram having a number of devices 10 communicating in a mixed network 100. The mixed network 100 includes a wireless network 20, a wireless/wired network 25. The network 20 includes UE 10-1 and the network 25 includes an eNB 10-2 and a network node 10-3. The network node 10-3 can comprise an NCE, MME, and/or SGW device, which can communicate with the eNB 10-2 and/or the UE 10-1 via a wired or wireless communication.

The UE 10-1 includes one or more processors 10-A1, one or more memories 10-B1 containing one or more programs 10-C1, a radio frequency transceiver 10-D1 able to receive and transmit data, a wired network interface 10-E1, and one or more antennas 10-F1. Further, the UE 10-1 may include a Pwr proc 10-G1 to also perform the operations in accordance with the example embodiments.

Similarly, the eNB 10-2 includes one or more processors 10-A2, one or more memories 10-B2 containing one or more programs 10-C2, a radio frequency transceiver 10-D2 able to receive and transmit data, a wired network interface 10-E2, and one or more antennas 10-F2. In the example of FIG. 1, the network node 10-3 includes one or more processors 10-A3, one or more memories 10-B3 containing one or more programs 10-C3, and a wired network interface 10-E3. Further, the eNB 10-2 may include a Pwr proc 10-G2 to also perform the operations in accordance with the example embodiments.

The network node 10-3 could be network device, such as for a virtual network operator (VNO) device and/or a home network device of a particular mobile equipment. Further, as illustrated there may be a wireless connection 10-D3 established between the UE 10-1 and the network node 10-3, as well as a wired/wireless connection between the eNB 10-2 and the network node 30. Any of these connections may be used for communications in accordance with the example embodiments of the invention. Similar to the UE 10-1 and the eNB 10-2, the network node 10-3 also may include a Pwr proc 10-G3 to also perform the operations in accordance with the example embodiments.

It is noted that any of the Pwr proc of the UE 10-1, the eNB 10-2, and/or the network node 10-3 is non-limiting and the operations in accordance with the example embodiments may be performed with another processor of these devices, such as the Proc(s) 10-A1, 10-A2, and/or 10-A3.

Further, the devices and/or connections as shown in FIG. 3 are merely illustrative of possible devices and/or connections suitable for use with optimizing an NB-IOT, and are not limiting to the example embodiments as disclosed herein. Further, the operations described herein relate to a mixed network, however this is not limiting and the example embodiments of the invention may be practiced in a non-mixed network environment.

The computer readable memories 10-B1, 10-B2, and 10-B3 may be of any type suitable to the local technical environment and may be implemented using any suitable data storage technology, such as semiconductor based memory devices, flash memory, magnetic memory devices and systems, optical memory devices and systems, fixed memory and removable memory. The processors 10-A1, 10-A2, and 10-A3 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the UE 10-1 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals and most any Machine-Type Communications (MTC) devices that incorporate combinations of such functions.

In addition, it is noted that although the example embodiments of the invention are described herein with reference to NB-IOT that can be deployed in GSM and LTE spectrum, this is non-limiting. The example embodiments of the invention can be practiced with current and future communications technologies including at least upcoming 5G technologies.

As similarly described above, only an RSRP threshold is taken into account in the random access resource selection procedure which is used for the CE level determination. An RSRP is the linear average of reference signal power (in Watts) across specified bandwidth (in number of REs). This is an important item that a UE has to measure for cell selection, and/or reselection. During such procedures a UE may estimate a path-loss by averaging measurements of a downlink RSRP. The UE then selects CE levels and PRACH resources based on coverage level given by the downlink RSRP measurements.

During a random access procedure a set of PRACH resources (e.g. time, frequency, and preamble sequences) is provided for each coverage level, e.g. a number of preamble sequences for each level. The PRACH resources per coverage level are configurable by System Information. The UE (e.g., UE selects PRACH resources based on coverage level given by a UE DL measurement, e.g. RSRP measurements.

In accordance with the example embodiments the power class of the UE, as disclosed above, is taken into account in PRACH resource selection for CE level determination. RSRP threshold for selecting the CE/repetition level is adjusted by UE power class specific parameter(s). The example embodiments provide an optimized CE level selection for a UE supporting the new power classes as described above.

In accordance with the example embodiments of the invention signalled RSRP thresholds may be adjusted as follows:

Let's assume:
CE level thresholds for CE level 1=−100 dBm
CE level thresholds for CE level 2=−130 dBm
CE level thresholds for CE level 3=−150 dBm
If the UE transmit power is lower or higher than targeted, this results an offset (fixed or configurable)
  Note that the lower transmit power case, e.g. positive offset, would be more typical, but both scenarios are good to cover
RSRP−Offset
  For the "special" power class the threshold is e.g. −100 dBm−10 dB=−110 dBm
  For the "special" power class the threshold is e.g. −130 dBm−10 dB=−140 dBm
  For the "special" power class the threshold is e.g. −150 dBm−10 dB=−160 dBm
RSRP+Offset
  For the "special" power class the threshold is e.g. −100 dBm+10 dB=−90 dBm
  For the "special" power class the threshold is e.g. −130 dBm+10 dB=−120 dBm
  For the "special" power class the threshold is e.g. −150 dBm+10 dB=−140 dBm
RSRP*Variable
  For the "special" power class the threshold is e.g. −100 dBm*1.1=−110 dBm For the "special" power class the threshold is e.g. −130 dBm*1.1=−143 dBm For the "special" power class the threshold is e.g. −150 dBm*1.1=−165 dBm RSRP/Variable For the "special" power class the threshold is e.g. −100 dBm/0.9=−111 dBm For the "special" power class the threshold is e.g. −130 dBm/0.9=−144 dBm For the "special" power class the threshold is e.g. −150 dBm/0.9=−166 dBm Previous CE Level If the UE is e.g. 23 dBm device and CE level determination based on RSRP measurement is CE level 2, the UE shall select CE level 2

If the UE is e.g. 14 dBm device and CE level determination based on RSRP measurement is CE level 2, the UE shall select CE level 1

Next CE Level

If the UE is e.g. 23 dBm device and CE level determination based on RSRP measurement is CE level 2, the UE shall select CE level 2

If the UE is e.g. 14 dBm device and CE level determination based on RSRP measurement is CE level 2, the UE shall select CE level 3

Offsets and variables above may be calculated based in the UE power class e.g.:

power−UE available power power+UE available power variable*UE available power variable/UE available power Offsets above may be UE power class specific e.g. 0 for 23 dBm device, 5 dB for 14 dBm device etc.

Variables above may be UE power class specific e.g. 1 for 23 dBm device, 0.75 for 14 dBm device etc.

Alternatively a network could provide indications of the assumed maximum UE TX power/Class used for CE level threshold definitions, and UE would autonomously determine the offset based on its actual maximum transmit power in relation to the assumed TX power.

Alternatively RSRP thresholds may signaled for each power classes.

Alternatively the UE selects PRACH resource set based on its power class i.e. 14 dBm device always selects PRACH resource 1 etc.

In accordance with the example embodiments of the invention there is optimizing the NB-IOT UE random access for lower power NB-IoT UE, e.g., 14 dBm. A power class of the UE is taken into account in PRACH resource selection for CE level determination, and RSRP threshold for selecting the CE/repetition level is adjusted by UE power class specific parameter(s).

If the UE transmit power is lower or higher than targeted, this results an offset (fixed or configurable):

RSRP−Offset: Offset depends on UE power class;
RSRP+Offset: Offset depends on UE power class;
RSRP*variable: variable depends on UE power class;
RSRP/variable: variable depends on UE power class;
Previous CE level: depends on UE power class;
Next CE level: depends on UE power class.

Possible alternatives in accordance with the example embodiments of the invention can include:

Alternative 1: Network could indicate the assumed maximum UE TX power/Class used for CE level threshold definitions, and UE would autonomously determine the offset based on its actual maximum transmit power in relation to the assumed TX power.

Alternative 2: RSRP thresholds may signalled for each power classes.

Alternative 3: The UE selects PRACH resource set based on its power class i.e. 14 dBm device always selects PRACH resource 1 etc.

In addition, UE could indicate if it has done adjustments to the CE level selection based on the maximum TX power level so that network can accommodate this in the DL radio resource configuration In accordance with the example embodiments a threshold can be set for any of the CE levels, CE level thresholds, and/or RSRP levels. Further, any of these thresholds or values associated with the operations in accordance with the example embodiments may be known by a network device, or may be determined by the network device during or in advance of the CE level operations as described herein. Further, any of these thresholds or values associated with the operations may be provided to the network device via signaling, such as unicast or broadcast signaling.

Broadcast and/or dedicated signaling could be used for providing the above information for the UE. Alternatively (some of) the above information may be statically specified in the specifications.

In addition if no suitable random access resource is available based on the above the UE shall consider the current cell as barred i.e. access is not allowed and the shall (re)select another cell.

Or any combination of above.

Alternatively or in addition, in accordance with an example embodiment of the invention a UE could indicate if it has done adjustments to the CE level selection based on the maximum TX power level so that network can accommodate this in the DL radio resource configuration. This indication would be additional information on top of UE capability signaling and could be provided jointly or separately, or even priori or beforehand.

As an example, the UE could compare if the CE level selection is different, based on two hypothesis, assuming selection accounting for corrections based on actual supported maximum TX power, or without any additional corrections applied to the CE level selection.

Depending whether the CE level selected with these two hypothesis is the same or different, UE could indicate to the network whether there could be difference in CE level for UL and DL.

This would allow network to optimize the DL and UL resource allocations and settings correctly.

Further, it is noted that, in accordance with an example embodiment, a UE would need to assume that the DL radio resource is configured as per the CE level selected in based on RACH.}

Figure 4A:
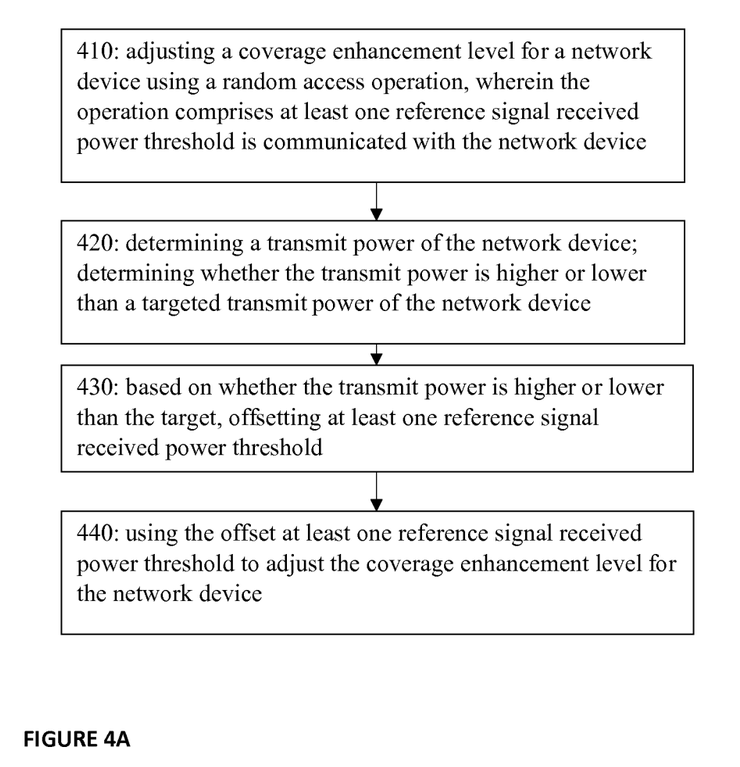
FIGS. 4A and 4B each show a method in accordance with the example embodiments which may be performed by an apparatus.

FIG. 4A illustrates operations which may be performed by a network device such as, but not limited to the UE 10-1 and/or the eNB 10-2 as in FIG. 3. As shown in step 410 there is adjusting a previous coverage enhancement level for a network device using a random access operation, wherein the operation comprises at least one reference signal received power threshold is communicated with the network device. As shown in step 420 there is determining a transmit power of the network device; determining whether the transmit power is higher or lower than a targeted transmit power of the network device. As shown in step 430 of FIG. 4A there is, based on whether the transmit power is higher or lower than the target, offsetting at least one reference signal received power threshold. Then as shown in step 440 there is using the offset at least one reference signal received power threshold to adjust the coverage enhancement level for the network device.

In accordance with the example embodiments as described in the paragraph above, for a case the transmit power is lower than the target, the offset of the at least one reference signal received power threshold comprises a positive offset, and for a case the transmit power is higher than the target, the offset of the at least one reference signal received power threshold comprises a negative offset.

In accordance with the example embodiments as described in the paragraphs above, the targeted transmit power of the network device is based on a power class of the network device.

In accordance with an example embodiments of the invention as described above there is an apparatus comprising: means for adjusting [proc(s) 10-A1, 10-A2, 10-G1, and/or 10-G2 as in FIG. 3] a previous coverage enhancement level for a network device [UE 10-1 and/or eNB 10-2 as in FIG. 3] using a random access operation, wherein the operation comprises at least one reference signal received power threshold is communicated with the network device. Means for determining [proc(s) 10-A1, 10-A2, 10-G1, and/or 10-G2 as in FIG. 3] a transmit power of the network device; determining whether the transmit power is higher or lower than a targeted transmit power of the network device. Means, based on whether the transmit power is higher or lower than the target, for offsetting [proc(s) 10-A1, 10-A2, 10-G1, and/or 10-G2 as in FIG. 3] at least one reference signal received power threshold. Further, there is means for using [by UE 10-1, eNB 10-2, and/or Network Node 10-3 as in FIG. 3] the offset at least one reference signal received power threshold to adjust the coverage enhancement level for the network device.

In the example aspect of the invention according to the paragraph above, wherein the means for adjusting, determining, offsetting, and using comprises a non-transitory computer readable medium [Mem(s) 10-B1, 10-B2, and/or 10-B3 as in FIG. 3] encoded with a computer program [PROGs 10-C1. 10-C2, and/or 10-C3 as in FIG. 3] executable by at least one processor [proc(s) 10-A1, 10-A2, 10-G1, and/or 10-G2 as in FIG. 3].

Figure 4B:
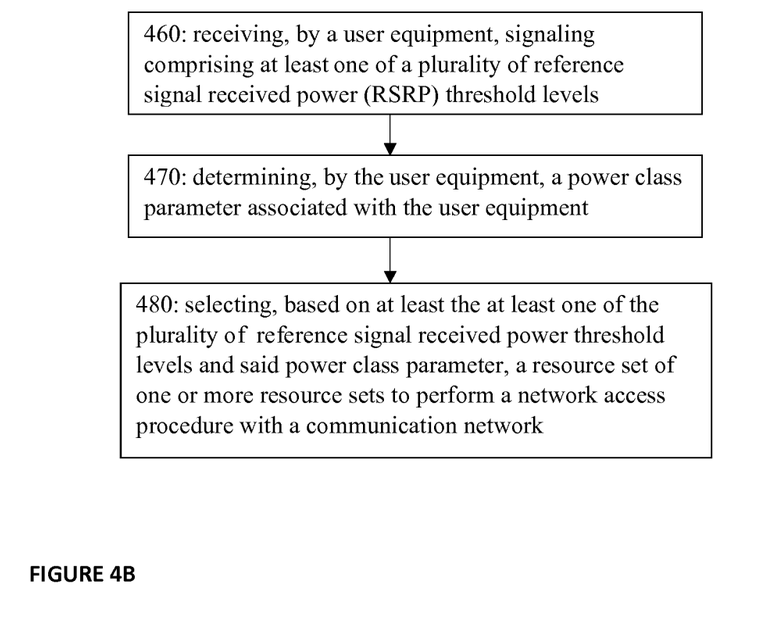

FIG. 4B illustrates further operations which may be performed by a network device such as, but not limited to the UE 10-1 and/or the eNB 10-2 as in FIG. 3. As shown in step 460 there is receiving, by a user equipment, signaling comprising at least one of a plurality of reference signal received power (RSRP) threshold levels. As shown in step 470 there is determining, by the user equipment, a power class parameter associated with the user equipment. Then in step 480 of FIG. 4B there is selecting, based on at least the at least one of the plurality of reference signal received power threshold levels and said power class parameter, a resource set of one or more resource sets to perform a network access procedure with a communication network.

In accordance with the example embodiments as described in the paragraph above, the power class parameter defines a maximum output power available at the user equipment for any transmission bandwidth.

In accordance with the example embodiments as described in the paragraphs above, said power class parameter associated with the user equipment is received from the communication network in a system information block.

In accordance with the example embodiments as described in the paragraphs above, the at least one of the plurality of reference signal received power threshold levels is used to determine a coverage enhancement level for selecting the resource set.

In accordance with the example embodiments as described in the paragraphs above, there is adjusting the at least one of the plurality of reference signal received power threshold levels by said power class parameter, and wherein the selecting comprises using the adjusted reference signal received power threshold levels to determine a coverage enhancement level for selecting the resource set for the network access procedure with the communication network.

In accordance with the example embodiments as described in the paragraphs above, the adjusting comprises: for a case that the power class parameter is less than a threshold level the adjusting comprises increasing the threshold level, and for a case that the power class parameter is greater than a threshold level the adjusting comprises decreasing the threshold level.

In accordance with the example embodiments as described in the paragraphs above, the plurality of reference signal received power threshold levels correspond to an RSRP threshold 1, an RSRP threshold 2, and an RSRP threshold 3.

In accordance with the example embodiments as described in the paragraphs above, for a case that the power class parameter indicates the user equipment is a 14 dBm device, the RSRP threshold 1 is selected to perform the network access procedure with the communication network.

In accordance with the example embodiments as described in the paragraphs above, the plurality of reference signal received power threshold levels are received from the communication network in a system information block.

In accordance with the example embodiments as described in the paragraphs above, the communication network comprises a narrow band internet of things (NB-IoT) network.

In accordance with the example embodiments as described in the paragraphs above, the user equipment is a device which supports a power class of 14 dBm.

In accordance with the example embodiments as described in the paragraphs above, the network access procedure comprises a packet random access channel procedure.

In accordance with an example embodiments of the invention as described above there is an apparatus comprising: means for receiving [the one or more antennas 10-F1 and/or 10-F2, proc(s) 10-A1, 10-A2, 10-G1, and/or 10-G2 as in FIG. 3], by a user equipment [UE 10-1 of FIG. 3], signaling comprising at least one of a plurality of reference signal received power (RSRP) threshold levels; means for determining [proc(s) 10-A1, 10-A2, 10-G1, and/or 10-G2 as in FIG. 3], by the user equipment, a power class parameter associated with the user equipment; and means, based on at least the at least one of the plurality of reference signal received power threshold levels and said power class parameter, for selecting [proc(s) 10-A1, 10-A2, 10-G1, and/or 10-G2 as in FIG. 3] a resource set of one or more resource sets to perform a network access procedure with a communication network.

In the example aspect of the invention according to the paragraph above, wherein the means for receiving, determining, and selecting comprises a non-transitory computer readable medium [Mem(s) 10-B1, 10-B2, and/or 10-B3 as in FIG. 3] encoded with a computer program [PROGs 10-C1. 10-C2, and/or 10-C3 as in FIG. 3] executable by at least one processor [proc(s) 10-A1, 10-A2, 10-G1, and/or 10-G2 as in FIG. 3].

Advantages of the example embodiments of the invention include at least:

- A power class of the UE is taken into account in CE level determination
- Intra and inter frequency interference reduced due to correct CE level usage in random access procedure
- Optimized UE battery consumption
- Optimized NW resource usage
- Similar behavior could also become prominent in NR where wider range of different MTC devices/services are considered to be supported.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the example embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" as may be used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   receiving, by a user equipment, signaling comprising at least one of a plurality of reference signal received power threshold levels;
   determining, by the user equipment, a power class parameter associated with the user equipment;
   selecting, based on at least the at least one of the plurality of reference signal received power threshold levels and said power class parameter, a resource set of one or more resource sets to perform a network access procedure with a communication network; and
   adjusting the at least one of the plurality of reference signal received power threshold levels by said power class parameter,
   wherein the selecting comprises using the adjusted reference signal received power threshold levels to determine a coverage enhancement level for selecting the resource set for the network access procedure with the communication network.

2. The method of claim 1, wherein the power class parameter defines a maximum output power available at the user equipment for any transmission bandwidth.

3. The method of claim 1, wherein the at least one of the plurality of reference signal received power threshold levels is used to determine a coverage enhancement level for selecting the resource set.

4. The method of claim 1, wherein the plurality of reference signal received power threshold levels are received from the communication network in a system information block.

5. The method of claim 1, wherein the communication network comprises a narrow band internet of things (NB-IoT) network.

6. The method of claim 1, wherein the user equipment is a device which supports a power class of 14 dBm.

7. The method of claim 1, wherein the network access procedure comprises a physical random access channel procedure.

8. An apparatus, comprising:
   at least one processor; and
   at least one memory including computer program code, where the at least one memory and the computer program code are configured, with the at least one processor, to cause the apparatus to at least:
   receive, by a user equipment, signaling comprising at least one of a plurality of reference signal received power threshold levels;
   determine, by the user equipment, a power class parameter associated with the user equipment;
   select, based on at least the at least one of the plurality of reference signal received power threshold levels and said power class parameter, a resource set of one or more resource sets to perform a network access procedure with a communication network; and
   adjust the at least one of the plurality of reference signal received power threshold levels by said power class parameter,
   wherein the selecting comprises using the adjusted reference signal received power threshold levels to determine a coverage enhancement level for selecting the resource set for the network access procedure with the communication network.

9. The apparatus of claim 8, wherein the power class parameter defines a maximum output power available at the user equipment for any transmission bandwidth.

10. The apparatus of claim 8, wherein said power class parameter associated with the user equipment is received from the communication network in a system information block.

11. The apparatus of claim 8, wherein the at least one of the plurality of reference signal received power threshold levels is used to determine a coverage enhancement level for selecting the resource set.

12. The apparatus of claim 8, wherein the plurality of reference signal received power threshold levels are received from the communication network in a system information block.

13. The apparatus of claim 8, wherein the communication network comprises a narrow band internet of things (NB-IoT) network.

14. The apparatus of claim 8, wherein the user equipment is a device which supports a power class of 14 dBm.

15. The apparatus of claim 8, wherein the network access procedure comprises a physical random access channel procedure.

16. An apparatus, comprising:
 at least one processor; and
 at least one memory including computer program code, where the at least one memory and the computer program code are configured, with the at least one processor, to cause the apparatus to at least:
 transmit, by a network node, signaling comprising at least one of a plurality of reference signal received power threshold levels; and
 receive, at the network node, uplink transmissions from a user equipment via a network access procedure on a resource set of one or more resource sets selected by the user equipment based on at least the at least one of the plurality of reference signal received power threshold levels and a power class parameter associated with the user equipment,
 wherein the at least one of the plurality of reference signal received power threshold levels is adjusted by said power class parameter, and the selected resource set of one or more resource sets are based on the adjusted reference signal received power threshold levels.

17. The apparatus of claim 16, wherein the power class parameter is defined as a maximum output power available at the user equipment for any transmission bandwidth.

18. An apparatus, comprising:
 at least one processor; and
 at least one memory including computer program code, where the at least one memory and the computer program code are configured, with the at least one processor, to cause the apparatus to at least:
 transmit, by a network node, signaling comprising at least one of a plurality of reference signal received power threshold levels; and
 receive, at the network node, uplink transmissions from a user equipment via a network access procedure on a resource set of one or more resource sets selected by the user equipment based on at least the at least one of the plurality of reference signal received power threshold levels and a power class parameter associated with the user equipment,
 wherein the at least one of the plurality of reference signal received power threshold levels is used to determine a coverage enhancement level for selecting the resource set.

19. An apparatus, comprising:
 at least one processor; and
 at least one memory including computer program code, where the at least one memory and the computer program code are configured, with the at least one processor, to cause the apparatus to at least:
 receive, by a user equipment, signaling comprising at least one of a plurality of reference signal received power threshold levels;
 determine, by the user equipment, a power class parameter associated with the user equipment; and
 select, based on at least the at least one of the plurality of reference signal received power threshold levels and said power class parameter, a resource set of one or more resource sets to perform a network access procedure with a communication network,
 wherein the at least one of the plurality of reference signal received power threshold levels is used to determine a coverage enhancement level for selecting the resource set.

* * * * *